United States Patent Office 3,400,192
Patented Sept. 3, 1968

3,400,192
PROCESS FOR PRODUCING HIGHLY SHRINKABLE LINEAR POLYESTER STRUCTURES
Adolf Hartmann, Gessertshausen, near Augsburg, and Gert Büttner, Bobingen, near Augsburg, Germany, assignors to Farbwerke Hoechst Aktiengesellschaft vormals Meister Lucius & Bruning, Frankfurt am Main, Germany, a corporation of Germany
No Drawing. Filed July 31, 1964, Ser. No. 386,766
Claims priority, application Germany, Aug. 2, 1963, F 40,399
7 Claims. (Cl. 264—288)

ABSTRACT OF THE DISCLOSURE

The preparation of high-shrinking structures of linear aromatic polyesters by drawing undrawn structures of linear aromatic polyesters in several stages in one direction, the drawing in the first stage amounting to at least 30% and at most 70% of the total drawing, which total drawing amounts to at least 60% of the highest possible value that can be obtained by a single drawing operation, the temperature in the first drawing stage being equal to or higher than the temperature in the second stage or the next stages, respectively.

---

The present invention relates to a process for preparing structures of linear aromatic polyesters having a high degree of shrinkage.

Shaped structures such as filaments or films which have been prepared from filament-forming linear aromatic polyesters are subjected, as is known, to a stretching process after having been shaped. During this stretching process the molecular structure of the articles undergoes an additional orientation which is the condition of the properties of the shaped structures which are appreciated in practice. Among these properties are, for example, a high tensile strength, a high resistance to rubbing, a good elasticity upon elongation and the bending strength. The capacity of the articles to shrink in boiling water or hot air is also considerably influenced by the stretching process.

The shrinking properties of the shaped structures which are demanded in practice depend on the purpose for which the articles are to be used. For example, filaments which can be used industrially should have a low degree of shrinkage only whereas fibres and filaments which are to be used for the manufacture of clothes must have a certain minimum capacity of shrinking if they are to be processed advantageously. There is also a demand for structures having a high degree of shrinkage within the range of about 40 to 70%. This applies inter alia to fibers which are to be processed so that they can be used for the preparation of high bulk filaments, fashionable knit goods or felts and to films serving for packaging purposes. Attempts have been made to impart a high degree of shrinkage to structures of the aforesaid kind by stretching them to a small extent only, for example by 30 to 50% of the highest possible extent. However, the performance properties, for example tensile strength, elongation and elasticity, of the structures which have thus been treated are altogether insufficient, so that the problem of preparing structures having a high degree of shrinkage from linear aromatic polyesters cannot be solved in this way.

Now we have found that the above-mentioned drawbacks can be avoided and shaped structures such as filaments, fibers, sheets or films having a high degree of shrinkage can be prepared from filament-forming linear aromatic polyesters by stretching the structures in several stages, the stretching in the first stage amounting to at least 30% and at most 70% of the total stretching which total stretching should amount to at least 60% of the highest possible value that can be attained in a single stretching operation, and by carrying out the stretching in the first stage at the same temperature as, or, preferably, at a higher temperature than, the stretching in the second stage.

The stretching brought about in the individual stages may be of different extent. In order to simplify the industrial realization of the process it is suitable, however, to carry out the stretching in two equal portions which together should amount to at least 60% of the highest possible value that can be obtained by a single stretching operation. It is particularly favorable to use in the first stretching stage a temperature that is higher, viz. by about 10 to 100° C., than the stretching temperature used in the second stage. It is also advantageous to carry out the first strecthing stage at a temperature that is by no more than 20° C. below the second order transition temperature and by at least 50° C. below the melting point of the polyester filaments. The upper limit of the temperature range is determined in all stretching stages by the softening point of the material. The temperature must not be higher than to ensure that even after the shrinking process the stretched material does not stick together.

In order to increase the shrinking capacity of the shaped structures it is particularly favorable, as has already been mentioned, to carry out the first stage at a temperature that is as high as possible and to carry out the subsequent stages at lower temperatures. It is possible to adjust definite values of shrinkage by varying the said difference of temperature and this is often important for the purpose for which the structures are to be used.

The realization of the process of the present invention on an industrial scale is easy and can be brought about by means of the usual apparatus. The unstretched structures, for example, polyester filaments, sheets or films (the filaments may be present in a small number or in the form of tows of high strength, for example, 500,000 deniers), are continuously passed over a plurality of rollers, each of which moves at a higher speed than the preceding one. By means of appropriate devices such as roller systems which, if desired, are provided with gummed pressing rollers it is ensured that the filaments do not slip but undergo the desired drawing between the rotating roller systems. For one stretching operation two systems of this kind are used. In such a case, the structures to be stretched by the process according to the invention have to pass several times through the stretching device, in each case the desired individual portion of stretching being brought about. It is however, advantageous to use more than two of the rotating systems and to carry out the whole process continuously. When, for example, the stretching is carried out in two stage in each of which an equal portion of stretching is brought about, three devices are required, the second and third of which are accelerated to an equal degree as compared to the preceding one and the difference between the number of revolutions of the first device and the number of revolutions of the third device is adjusted so that the stretching obtained amounts to at least 60% of the highest possible stretching. Between the rotating stretching devices are arranged adjustable heating elements, for example, metal plates or rods, tubes or canels or baths containing inert liquids such as water, paraffin oil or low melting metal alloys. The speed at which the goods to be treated are passed through the device depends on the thickness of the filaments and should be such that during the stretching operation a sufficient heating of the goods is ensured.

As starting materials for the process of the invention may be used all aromatic linear polyesters from which stretchable shaped structures can be prepared. Polyethylene terephthalate may be mentioned in the first place.

Other linear polyesters, for example, the polycondensation product of dimethyl terephthalate and 1,4-dimethylol cyclohexane, and various copolyesters which contain small portions of one or more modifying components, may also be used. As examples of such compounds may be mentioned isophthalic acid, sulphoisophthalic acid, 4,4'-diphenyl dicarboxylic acid, sulphonyl dibenzoic acid, p-($\beta$-hydroxyethoxy)-benzoic acid and glycols of high molecular weight or substituted glycols, for example, diethylene glycol or 2,2-dimethyl propane diol-1,3. The chief component of these copolyesters is in general polyethylene terephthalate. The shaped structures are in general prepared in known manner by processing polyesters or copolyesters or mixtures of polyesters or copolyesters in the molten state into filaments, fibers or films. It is also possible, however, in particular in the case of copolyesters, to prepare the shaped structures from a solution which is processed according to the dry or wet spinning process.

The filaments or films which have been prepared by the process according to the invention have a much higher shrinking capacity than the filaments or films which have been prepared by a known process and stretched to the same total extent. This applies for the heating without tension in an inert medium, for example, dry air or metal baths, for the shrinking in boiling water or hot steam and for the action of swelling agents, for example, methylene chloride. The mechanical properties of the shaped structure prepared according to the invention are just as good as those of the shaped structures which have been prepared by a known process, that is to say, they are the same as those of structures having a normal shrinking property. The shrinkage in boiling water or hot steam is particularly important. Fibers of polyethylene terephthalate, for example, which have been prepared by the process according to the invention and which have been stretched in two stages at 80° and 45° C., respectively, each time by 50% of the highest possible value, shrink in boiling water by 44%. Before this shrinking they had a strength of 4.1 grams per denier and an elongation at break of 46%. By appropriate chemical modifications of the raw material the shrinking property can be further increased. Copolyesters containing symtrically substituted diols as the modifying components, for example the above-mentioned 2,2-dimethyl propane diol, are, for example, of particular interest in this respect. In this case, the process of the invention enables extraordinarily high shrinking values to be obtained, which may amount, for example, to more than 70% in water having a temperature of 100° C. and up to 60% in air of 200° C., if 5 to 6% of dimethyl propane diol have been incorporated with the polyethylene terephthalate. In spite of this high degree of shrinkage, structures of this kind have very good mechanical properties.

The stretched structures can be processed by known methods. They are first treated, as is usually done, with suitable substances which render them resistant to electrostatic charge. Endless filaments are twisted and made ready for used and, for the preparation of staple fibres, the above-mentioned tows are crimped and cut. In all these operations the higher shrinking property of the structures prepared according to the invention has to be taken into account. This has to be done, for example, when adjusting the temperature that is necessary for improving the stability of the twist or crimp and in the drying processes. With regard to the further processability, above all that of fibers and filaments, it is of importance that, owing to their good textile mechanical properties, the structures which have been prepared according to the invention and which have a high degree of shrinkage can without difficulty be processed into yarns and woven fabrics and also be processed in admixture with fibers or filaments of any kind which do not shrink or shrink to a low degree only. The latter possibility is of great importance in practice since it enables interesting structural effects to be attained.

The following examples serve to illustrate the invention but they are not intended to limit it thereto.

Example 1

A filament of polyethylene terephthalate composed of 12 individual filaments and having a total titer of 162 deniers was passed through two three-roller-systems provided with gummed pressing rollers and through a heating tube arranged between the three-roller-systems, which had a length of 50 centimeters and an internal temperature (air space) of 80° C. The filament was run in at a speed of 10 meters per minute and the number of revolutions of the second three-roller-system was increased to such an extent that the filament was stretched in a ratio of 1:2.25. The filament was wound up and the process was repeated at the same temperature, the filament being then stretched in a ratio of 1:2.0. In boiling water the filament underwent a shrinkage of 16% and in air of 200° C. it shrank by 23%. The individual filaments had a strength of 5.4 grams per denier and an elongation at break of 33%.

In contradistinction thereto, an identical filament which had passed once through the apparatus and had been stretched during this process in the highest possible ratio of 1:4.8 shrank by 10% in boiling water and by 20% in air of 200° C. Its strength then amounted to 5.9 grams per denier and its elongation at break to 31.5%.

Example 2

A stretching device was composed of three three-roller-systems provided with gummed pressing rollers and of two heatable tubes of a length of 50 centimeters which were arranged between the three-roller-systems. The air in the first of the two heatable tubes was heated to 80° C. and that in the second heatable tube to 45° C. A filament like that described in Example 1 was run into the first three-roller-system at a speed of 10 meters per minute and the speeds at which the two following three-roller-systems moved was adjusted in such a manner that the filament was drawn off by the second system at a rate of 22.5 meters per minute and by the third system at a rate of 45 meters per minute. The filaments thus obtained shrank by 44% in boiling water and by 26% in air of 200° C. They had a strength of 4.1 grams per denier and an elongation at break of 46%.

Example 3

A copolyester which had been prepared from dimethyl terephthalate, ethylene glycol and 7%, calculated on the dimethyl terephthalate used, of 2,2-dimethyl propane diol-1,3, was spun in the molten state into filament having the same number of individual filaments and the same total titer as the filament described in Example 1. The filament was stretched in exactly the same manner as described in Example 1 whereupon filaments were obtained which shrank by 40% in boiling water, by 43% in air of 180° C. and by 50% in air of 200° C. The shrinkage of the filaments in methylene chloride at room temperature amounted to 36%. The filaments had a strength of 4.5 grams per denier and an elongation at break of 34%. In contradistinction thereto, an identical filament of the aforesaid copolyester which had been passed once through the stretching apparatus and been stretched by the highest possible ratio of 1:4.5 shrank by 27% in boiling water, by 36% in air of 180° C. and by 43% in air of 200° C. It had a strength of 4.7 grams per denier and an elongation at break of 31%.

Example 4

The unstretched filament which had been described in Example 3 and which had been prepared from the copolyester of dimethyl terephthalate, ethylene glycol and 2,2-dimethyl propane diol was continuously stretched in two stages in the apparatus described in Example 2. The air in the first heating tube had a temperature of 80° C. and that in the second heating tube had a temperature of 65° C. The speed at which the filament was run in and the number of revolutions of the three-roller-systems were the same as those mentioned in Example 2. The filaments that were thus obtained shrank by 72% in boiling water and by 60% in air of 200° C. They had a strength of 4.2 grams per denier and an elongation at break of 30%.

We claim:

1. A process for preparing structures having a high degree of shrinkage from linear aromatic filament-forming polyesters comprising drawing undrawn structures of linear aromatic filament-forming polyesters in one direction in several stages, the drawing in the first stage being to at least 30% and at most 70% of the total drawing, which total drawing amounts to at least 60% of the highest possible value that can be obtained by a single drawing operation, and the drawing in the first stage being at a temperature which is above the temperature at which the drawing is carried out in the second stages.

2. The process according to claim 1, wherein the structures are drawn in two stages, the drawing in the first and second stages being without intermediate cooling of the polyester.

3. The process according to claim 1, wherein the drawing temperature in the first stage is no more than 20° C. below the second order transition temperature and at least 50° C. below the melting point of the polyester filaments.

4. The process according to claim 1, wherein the drawing temperature in the second stage is from 10 to 100° C. below that of the first stage.

5. The process according to claim 1, wherein the entire drawing process is carried out continuously.

6. The process according to claim 1, wherein the structures are filaments.

7. The process according to claim 1, wherein the structures are films.

References Cited

UNITED STATES PATENTS

| | | | |
|---|---|---|---|
| 2,615,784 | 10/1952 | McClellan | 264—342 |
| 2,916,764 | 12/1959 | Gerber | 264—95 |
| 3,088,173 | 5/1963 | Jones. | |
| 3,264,390 | 8/1966 | Tanner | 264—171 |
| 3,293,339 | 12/1966 | Gates | 264—210 |
| 3,323,190 | 6/1967 | Boltniew | 264—210 |
| 3,349,154 | 10/1967 | Dighton | 264—209 X |
| 2,578,899 | 12/1951 | Pace | 264—289 |
| 3,187,075 | 6/1965 | Seifried et al. | 264—210 X |
| 3,057,825 | 10/1962 | Tassler | 264—288 X |

JULIUS FROME, *Primary Examiner.*

J. H. WOO, *Assistant Examiner.*